United States Patent
Moroi

(10) Patent No.: US 10,081,277 B2
(45) Date of Patent: Sep. 25, 2018

(54) TRIM COVER AND SEAT PART

(71) Applicant: TACHI-S CO., LTD., Tokyo (JP)

(72) Inventor: Koichi Moroi, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/667,989

(22) Filed: Aug. 3, 2017

(65) Prior Publication Data

US 2018/0037145 A1    Feb. 8, 2018

(30) Foreign Application Priority Data

Aug. 3, 2016   (JP) .................................. 2016-152739

(51) Int. Cl.
| | | |
|---|---|---|
| A47C 31/00 | (2006.01) | |
| B60N 2/58 | (2006.01) | |
| A47C 31/02 | (2006.01) | |
| B68G 7/12 | (2006.01) | |
| A47C 7/18 | (2006.01) | |
| A47C 31/11 | (2006.01) | |

(52) U.S. Cl.
CPC .......... *B60N 2/5825* (2013.01); *A47C 31/023* (2013.01); *B60N 2/5883* (2013.01); *B68G 7/12* (2013.01); *A47C 7/185* (2013.01); *A47C 31/026* (2013.01); *A47C 31/11* (2013.01)

(58) Field of Classification Search
CPC .... B60N 2/5825; B60N 2/5833; A47C 7/185; A47C 31/026; A47C 31/11
USPC ...... 297/218.1–218.5, 452.58, 452.6, 452.61
See application file for complete search history.

(56) References Cited

U.S. PATENT DOCUMENTS

| | | | | |
|---|---|---|---|---|
| 3,512,191 A | * | 5/1970 | Wall .................... | A47C 27/146 297/218.2 |
| 4,285,544 A | * | 8/1981 | Zapf ...................... | A47C 3/16 297/218.3 |
| 5,820,222 A | * | 10/1998 | De Filippo .......... | B60N 2/5841 297/452.58 |
| 6,857,699 B2 | * | 2/2005 | Ashton ................ | B60N 2/5825 297/220 |
| 7,258,399 B2 | * | 8/2007 | Neustat ................ | A47C 7/72 297/218.2 |
| 7,390,059 B2 | * | 6/2008 | Brockschnieder ... | B60N 2/5816 297/228.13 |
| 7,585,025 B2 | * | 9/2009 | Welch .................. | B60N 2/80 297/218.2 |

(Continued)

FOREIGN PATENT DOCUMENTS

| | | |
|---|---|---|
| JP | 6-86698 U | 12/1994 |
| JP | 5155572 B2 | 3/2013 |

*Primary Examiner* — Syed A Islam
(74) *Attorney, Agent, or Firm* — Seed IP Law Group LLP

(57) ABSTRACT

A trim cover for covering a pad, includes a hook and a skin, wherein: the hook includes: a base portion to which a first end portion of the skin is fixed; and a lock portion that is connected to the base portion and into which a second end portion of the skin is inserted; the first end portion includes: a fixed portion that is fixed to the base portion to be overlapped with a front surface of the base portion; and a folded portion that is folded toward a rear surface of the base portion along an edge of the base portion on a side opposite to the lock portion; and both side portions of the folded portion are arranged to protrude toward the lock portion and arranged to be overlapped with the lock portion and protrude to the outside in the width direction from the lock portion.

5 Claims, 14 Drawing Sheets

(56) References Cited

U.S. PATENT DOCUMENTS

| | | | |
|---|---|---|---|
| 8,061,780 B2 * | 11/2011 | Tsuji | B29C 44/1271 |
| | | | 297/218.1 |
| 8,979,195 B2 * | 3/2015 | Itakura | B60N 2/6027 |
| | | | 297/218.2 |
| 9,161,635 B2 * | 10/2015 | Toribuchi | A47C 31/023 |
| 2010/0259079 A1 | 10/2010 | Matsuzaki et al. | |
| 2015/0123439 A1 * | 5/2015 | Jordan | A47C 31/113 |
| | | | 297/228.1 |

* cited by examiner

TRIM COVER AND SEAT PART

CROSS-REFERENCE TO RELATED APPLICATION(S)

This application is based upon and claims the benefit of priority from Japanese Patent Application No. 2016-152739, filed on Aug. 3, 2016, the entire contents of which are incorporated herein by reference.

BACKGROUND

1. Field of the Invention

The present invention relates to a trim cover and a seat part formed by covering a pad with the trim cover.

2. Description of the Related Art

A seat part for a vehicle seat such as a headrest typically includes a pad and a trim cover for covering the pad. The trim cover is provided with an opening into which the pad is inserted and the opening is closed after the pad is inserted into the trim cover. A hook may be used for closing the opening (for example, refer to JP-UM-A-6-86698 and Japanese Patent No. 5155572).

As illustrated in FIGS. 10 and 11, a skin of a trim cover 101 of a headrest 100 disclosed in JP-UM-A-6-86698 includes a peripheral surface skin piece 102 that circumferentially covers a lower surface, a front surface, an upper surface, and a rear surface of the headrest 100, and two side surface skin pieces 103 that cover both side surfaces of the headrest 100, and is formed by sewing these skin pieces together. An opening of the trim cover into which a pad 104 is inserted is provided between a first end portion 102a and a second end portion 102b of the peripheral surface skin piece 102 arranged on the lower surface of the headrest 100, and the both end portions 102a and 102b are joined with each other through a hook 105, thereby closing the opening.

The hook 105 has a base portion 106 to which the first end portion 102a of the peripheral surface skin piece 102 is fixed in a state of being folded on an outer surface of the base portion 106, and a lock portion 107 into which the second end portion 102b of the peripheral surface skin piece 102 is inserted, and is formed to have a substantially J-shaped cross section as a whole. The first end portion 102a that is fixed to the base portion 106 and the second end portion 102b that is inserted into the lock portion 107 are abutted against each other.

As illustrated in FIGS. 13 and 14, a skin of a trim cover 201 of a seat back 200 disclosed in Japanese Patent No. 5155572 includes a front surface skin piece 202A that covers an upper surface, a front surface, and a lower surface of the seat back 200, a rear surface skin piece 202B that covers a rear surface of the seat back 200, and two side surface skin pieces 203 that cover both side surfaces of the seat back 200, and is formed by sewing these skin pieces together. An opening of the trim cover 201 into which a pad 204 is inserted is formed between a first end portion 202a of the front surface skin piece 202A and a second end portion 202b of the rear surface skin piece 202B, and the both end portions 202a and 202b are joined with each other through a hook 205, thereby closing the opening.

The hook 205 has a base portion 206 to which the second end portion 202b of the rear surface skin piece 202B is fixed, and a lock portion 207 into which the first end portion 202a of the front surface skin piece 202A is inserted, and is formed to have a substantially J-shaped cross section as a whole. A terminal end of the second end portion 202b of the rear surface skin piece 202B is also inserted into the lock portion 207 and the second end portion 202b of the rear surface skin piece 202B fixed to the base portion 206 and the first end portion 202a of the front surface skin piece 202A inserted into the lock portion 207 are overlapped with each other.

When two skin pieces are sewn together, typically, both skin pieces are sewn together in a state in which the skin pieces are pressed by a presser foot of a sewing machine, and the presser foot is moved along the seam of the both skin pieces.

As illustrated in FIG. 12, in the trim cover 101 of the headrest 100 disclosed in JP-UM-A-6-86698, the peripheral surface skin piece 102 and the side surface skin piece 103 are sewn together and the presser foot of the sewing machine is moved along the seam of the peripheral surface skin piece 102 and the side surface skin piece 103. The hook 105 is provided not to be overlapped with a track P of the presser foot that is moved along the seam.

In the trim cover 101 of the headrest 100 disclosed in JP-UM-A-6-86698, the first end portion 102a and the second end portion 102b joined by the hook 105 are abutted against each other and a slight, gap is formed between the both end portions 102a and 102b. The hook 105 is not arranged behind a gap portion S overlapped with the track P of the presser foot and the pad 104 inside the cover is exposed through the gap portion S. Thus, there is a concern of deterioration in the appearance of the headrest.

In the trim cover 201 of the headrest 200 disclosed in Japanese Patent No. 5155572, the first end portion 202a and the second end portion 202b joined by the hook 205 are overlapped each other and thus a problem that a slight gap is formed between the both end portions 202a and 202b and the pad 204 inside the cover is exposed through the formed gap is solved. However, the second end portion 202b needs to be further inserted into the lock portion 207 of the hook 205 into which the first end portion 202a is inserted and thus the operation is not easy.

SUMMARY

The present invention is made in consideration of the above circumstances and an object thereof is to provide a trim cover and a seat part capable of facilitating a joint operation of two end portions of a skin to be joined with each other through a hook and solving a problem that a pad inside the cover is exposed through a gap formed between the joined two end portions.

According to an aspect of the present invention, there is provided a trim cover for covering a pad including: a hook; and a skin having a first end portion and a second end portion that are joined with each other through the hook, wherein: the hook includes: a base portion to which the first end portion of the skin is fixed; and a lock portion that is connected to the base portion and into which the second end portion of the skin is inserted; the first end portion of the skin is formed wider than the base portion and the lock portion of the hook, and includes: a fixed portion that is fixed to the base portion to be overlapped with a front surface of the base portion of the hook in a state of being folded on an outer surface of the base portion; and a folded portion that is provided on a side closer to a terminal end than the fixed portion and is folded toward a rear surface of the base portion along an edge of the base portion of the hook on a side opposite to the lock portion; and both side portions of the folded portion in a width direction are arranged to protrude toward the lock portion of the hook from the fixed portion and further arranged to be overlapped with the lock portion and protrude to the outside in the width direction from the lock portion.

According to another aspect of the present invention, there is provided a seat part including: a pat; and the above trim cover covering the pad.

According to the present invention, it is possible to provide a trim cover and a seat part capable of facilitating a joint operation of two end portions of a skin to be joined with each other through a hook and solving a problem that a pad inside the cover is exposed through a gap formed between the joined two end portions.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
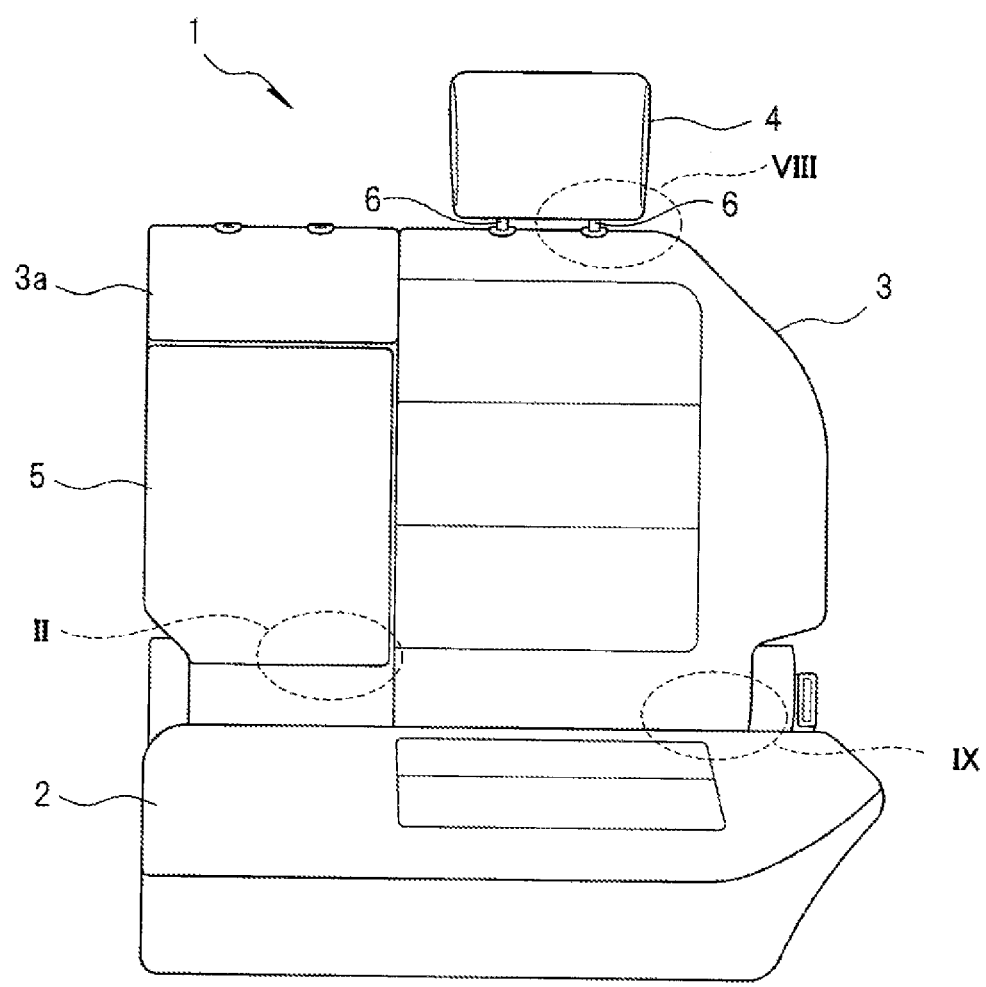
FIG. 1 is a front view of an example of a vehicle seat illustrating an embodiment of the present invention.

FIG. 1 illustrates an example of a vehicle seat for illustrating an embodiment of the present invention.

A vehicle seat 1 illustrated in FIG. 1 is a seat that is installed on a passenger seat side in a rear part of an automobile and includes a seat cushion 2 that constitutes a seat surface portion, a seat back 3 that constitutes a backrest portion, and a headrest 4 that supports a head of a passenger seated on the seat. An auxiliary seat back 3a that is arranged between a driver seat side seat (not illustrated) and the passenger seat side seat in the rear part is integrally provided in the seat back 3, and a drawn-out type armrest 5 that can be tiltable to the seat cushion 2 side is housed in the auxiliary seat back 3a.

The seat cushion 2, the seat back 3, the headrest 4, and the armrest 5 respectively have a pad formed of, for example, a foamed material such as urethane foam, and a frame that supports the pad. The pad of each of the seat cushion 2, the seat back 3, the headrest 4, and the armrest 5 is covered with a trim cover.

The trim cover of each of the seat cushion 2, the seat back 3, the headrest 4, and the armrest 5 is formed by sewing a plurality of skin pieces and as the skin pieces, for example, leather (natural leather or synthetic leather) or fabric (woven fabric, knit fabric, or nonwoven fabric) may be used. The skin piece may have a single layer structure of leather or fabric or may have a multilayer structure in which leather or fabric is used as an outer material and a wadding (for example, a resin foam such as elastically deformable soft polyurethane foam) is laminated on the leather or fabric. The trim cover may be formed by the same kind of skin pieces or may be formed by a plurality of different skin pieces depending on the portion.

The pad of each of the seat cushion 2, the seat back 3, the headrest 4, and the armrest 5 is formed of, for example, a relatively soft foamed resin such as foamed polyurethane.

Figure 2:
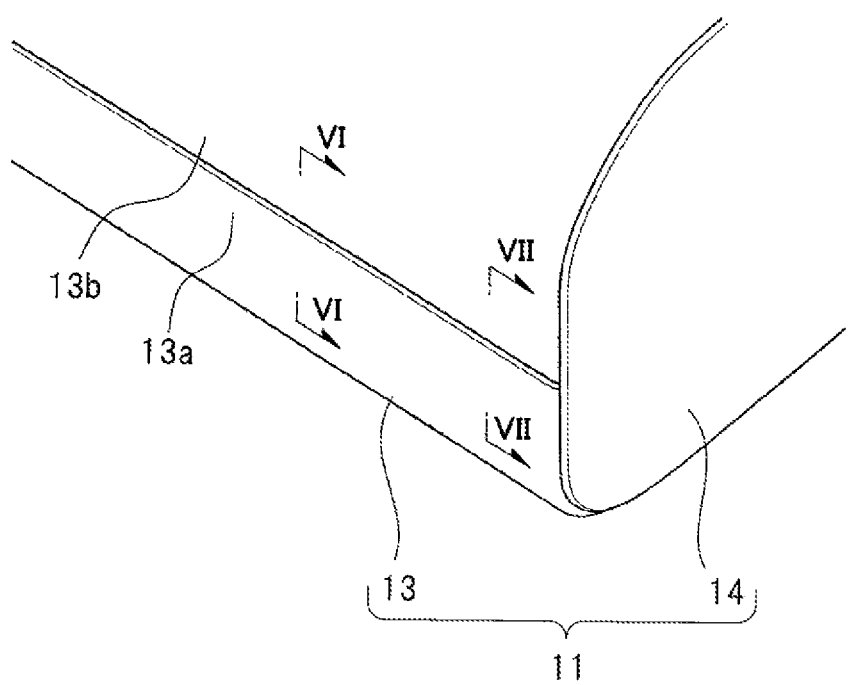
FIG. 2 is a perspective view of a part of an armrest of the vehicle seat in FIG. 1 surrounded by a broken line circle II, and is a perspective view illustrating a state in which a first end portion and a second end portion of a skin constituting a trim cover are joined.
Figure 3:
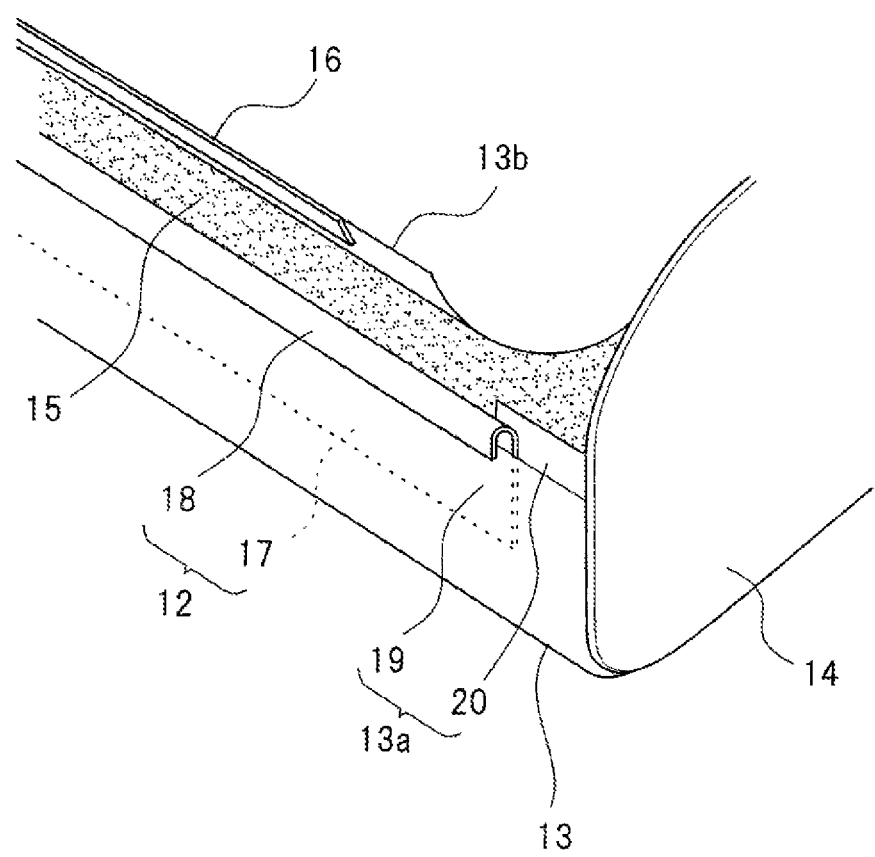
FIG. 3 is a perspective view illustrating a state in which the first end portion and the second end portion of the skin constituting the trim cover in FIG. 2 are separated.

FIGS. 2 and 3 illustrate a portion in which the first end portion and the second portion of the skin constituting the trim cover of the armrest 5 are joined.

The trim cover 10 of the armrest 5 includes a skin 11, and a hook 12 that closes an opening provided in the skin 11.

The skin 11 includes a peripheral surface skin piece 13 that circumferentially covers a front surface, an upper surface, a rear surface and a lower surface of the armrest 5 directed to a front side of a vehicle in a state in which the armrest 5 is drawn out from the auxiliary seat back 3a, and two side surface skin pieces 14 that cover both side surfaces of the armrest 5 (only one side is illustrated in the drawing), and is formed by sewing these skin pieces into a bag shape. A first end portion 13a and a second end portion 13b of the peripheral surface skin piece 13 are arranged on the rear surface of the armrest 5 and an opening of the trim cover 10 into which a pad 15 is inserted is provided between the first end portion 13a and the second end portion 13b of the peripheral surface skin piece 13 on the rear surface of the armrest 5.

The hook 12 is fixed to the first end portion 13a of the peripheral surface skin piece 13. For example, a reinforcing plate 16 formed of resin is fixed to the second end portion 13b of the peripheral surface skin piece 13. The second end portion 13b is locked with the hook 12 that is fixed to the first end portion 13a so that the opening of the trim cover 10 is closed.

The hook 12 has a band plate-shaped base portion 17 and a lock portion 18 that is connected to the base portion 17 and has a substantially U-shaped cross section, is formed of, for example, resin, and is integrally formed to have a substantially J-shaped cross section as a whole. The first end portion 13a of the peripheral surface skin piece 13 is fixed to the base portion 17 and the second end portion 13b and the reinforcing plate 16 are inserted and locked into the lock portion 18.

The first end portion 13a of the peripheral surface skin piece 13 has a fixed portion 19 that is fixed to the base portion 17 of the hook 12 and a folded portion 20 that is provided on the side closer to the terminal end than to the fixed portion 19.

The fixed portion 19 is overlapped with the front surface of the base portion 17 of the hook 12 in a state of being folded on the outer surface of the base portion 17 and is fixed to the base portion 17 by being sewn with the base portion 17. The folded portion 20 is folded toward the rear surface of the base portion 17 along an edge of the base portion 17 on the side opposite to the lock portion 18 and protrudes toward the lock portion 18 of the hook 12 from the fixed portion 19.

The fixed portion 19 and the folded portion 20 are formed wider than the base portion 17 and the lock portion 18 of the hook 12, and both side portions of the folded portion 20 in the width direction are arranged to be overlapped with the base portion 17 and the lock portion 18 and protrude to the outside in the width direction from the base portion 17 and the lock portion 18. In the example illustrated in the drawing, the center portion between the both side portions of the folded portion 20 in the width direction is cut out.

Figure 4:
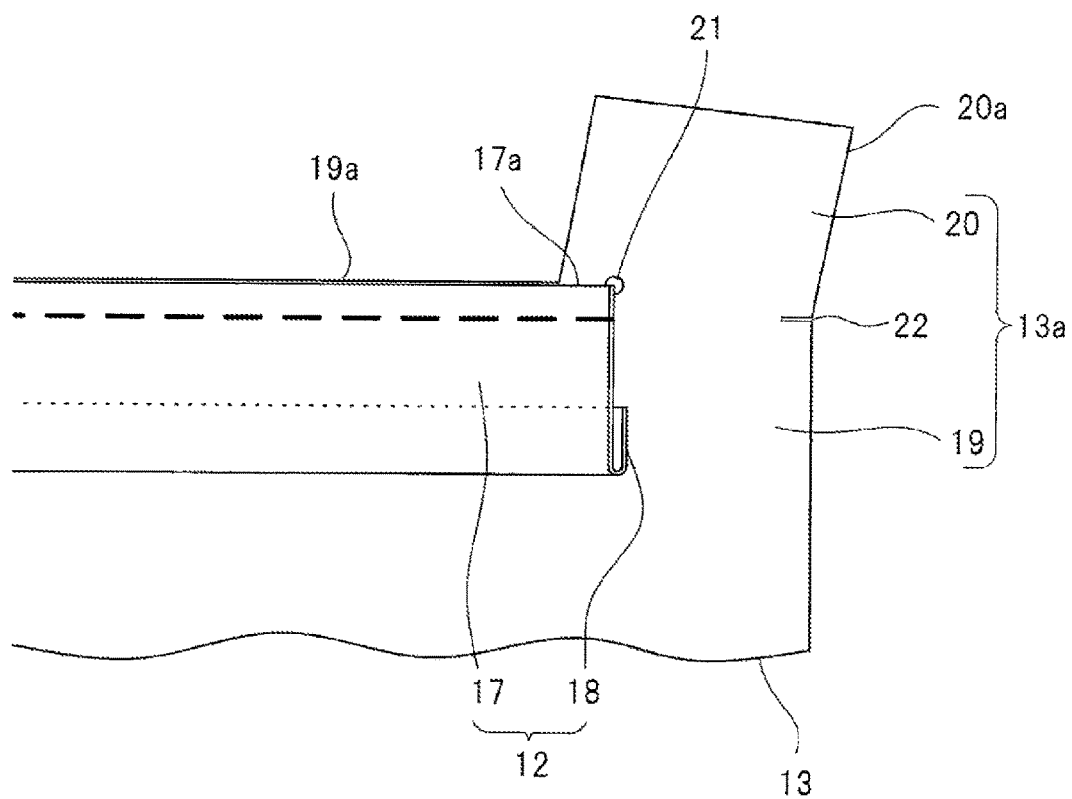
FIG. 4 is a schematic view illustrating a method of fixing the first end portion of the skin constituting the trim cover in FIG. 2 to a hook.
Figure 5:
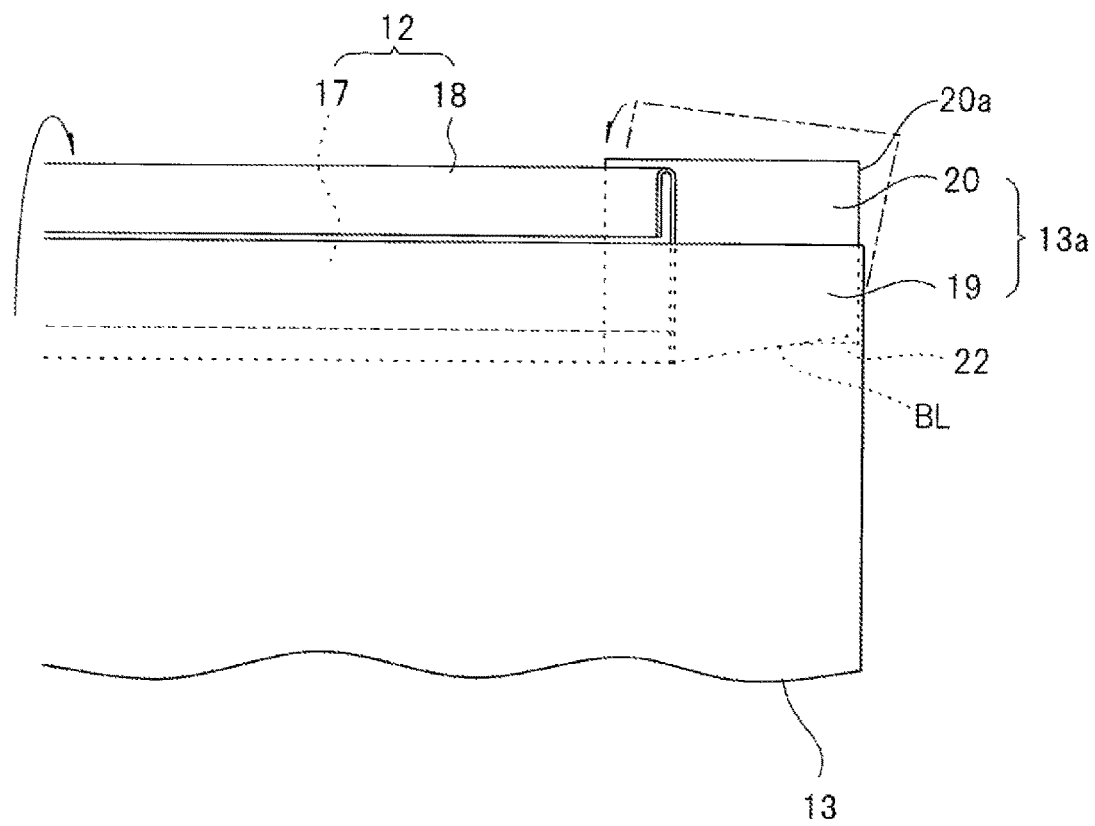
FIG. 5 is a schematic view illustrating the method of fixing the first end portion of the skin constituting the trim cover in FIG. 2 to the hook.

FIGS. 4 and 5 illustrate a method of fixing the first end portion 13a of the peripheral surface skin piece 13 to the hook 12.

As illustrated in FIG. 4, out of the base portion 17 and the lock portion 18 of the hook 12, in a state in which the base portion 17 is directed to the terminal end of the first end portion 13a (to the folded portion 20), the base portion 17 is placed to be overlapped with the center portion of the fixed portion 19 of the first end portion 13a in the width direction.

Since the center portion of the folded portion 20 in the width direction is cut out, an edge 19a is formed at the center portion of the fixed portion 19 in the width direction and an edge 17a of the base portion 17 is aligned with the edge 19a of the fixed portion 19. Thus, the base portion 17 can be properly and easily placed to be overlapped with the fixed portion 19.

A positioning hole 21 with which the end of the edge 17a of the base portion 17 is overlapped may be formed in the fixed portion 19, and the base portion 17 can be properly and easily placed to be overlapped with the center portion of the fixed portion 19 in the width direction by the positioning hole 21.

The base portion 17 and the fixed portion 19 with which the base portion 17 is placed to be overlapped are sewn together and the fixed portion 19 is fixed to the base portion 17.

Subsequently, as illustrated in FIG. 5, the base portion 17 of the hook 12 is turned over. Thus, the fixed portion 19 of the first end portion 13a is folded on the front surface of the base portion 17, and the folded portion 20 of the first end portion 13a is folded toward the rear surface of the base portion 17 along the edge 17a of the base portion 17 so as to be wound around the base portion 17.

The folded portion 20 that has been folded is arranged to protrude toward the lock portion 18 of the hook 12 from the fixed portion 19 and the both side portions of the folded portion 20 in the width direction are arranged to be overlapped with the base portion 17 and the lock portion 18 and protrude to the outside in the width direction from the base portion 17 and the lock portion 18. Both side portions of the first end portion 13a, which includes the both side portions of the folded portion 20 in the width direction, in the width direction are respectively sewn with the side surface skin pieces 14 (refer to FIGS. 2 and 3).

Here, when the folded portion 20 is folded toward the rear surface of the base portion 17, the both side portions of the folded portion 20 in the width direction are collapsed toward the center portion in the width direction. Since the center portion of the folded portion 20 in the width direction is cut out, the collapse of the both side portions of the folded portion 20 in the width direction is not disturbed and slackness is prevented from occurring in the folded portion 20. Thus, the both side portions of the first end portion 13a, which includes the both side portions of the folded portion 20 in the width direction, in the width direction and the side surface skin pieces 14 are easily sewn together.

In the both side portions of the first end portion 13a in the width direction, a slit 22 that extends along a boundary BL between the fixed portion 19 and the folded portion 20 that has been folded from the edge of each side portion may be provided and due to the slit 22, the both side portions of the folded portion 20 in the width direction are smoothly collapsed. Thus, slackness is further prevented from occurring in the folded portion 20.

As illustrated in FIG. 4, it is preferable that edges 20a of the both side portions of the folded portion 20 in the width direction are inclined to be broadened toward the end in a state in which the fixed portion 19 and the folded portion 20 are spread in a plane shape. When the folded portion 20 is folded toward the rear surface of the base portion 17 and the both side portions of the folded portion 20 in the width direction are collapsed toward the center in the width direction, edges of the both side portions of the first end portion 13a including the edges 20a in the width direction are linearly formed. Thus, the both side portions of the first end portion 13a, which includes the both side portions of the folded portion 20 in the width direction, in the width direction and the side surface skin pieces 14 are easily sewn together.

Figure 6:
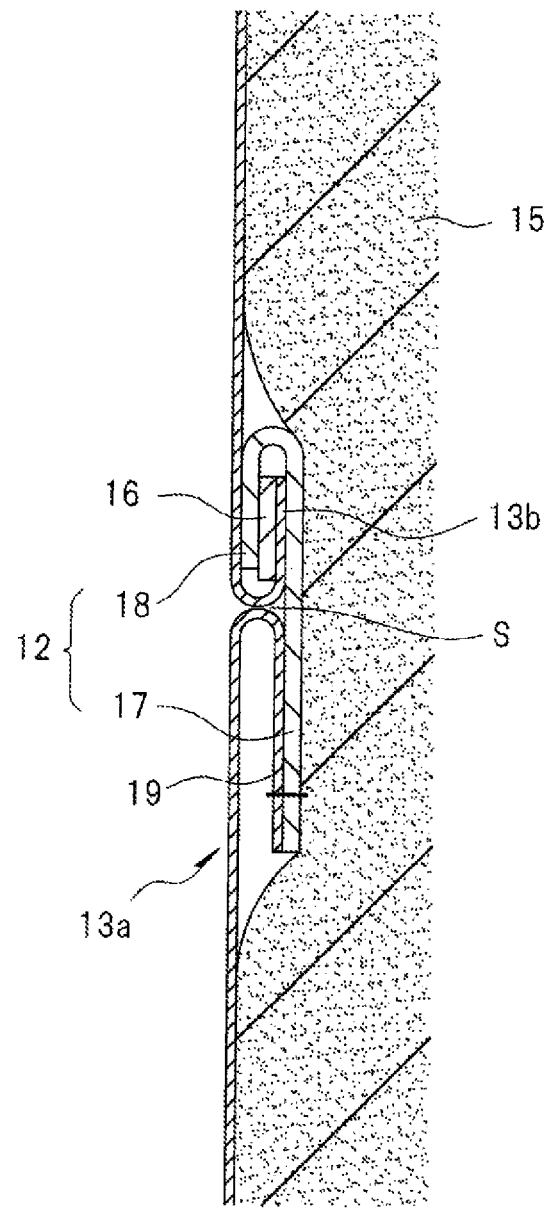
FIG. 6 is a cross-sectional view taken along line VI-VI in FIG. 2.
Figure 7:
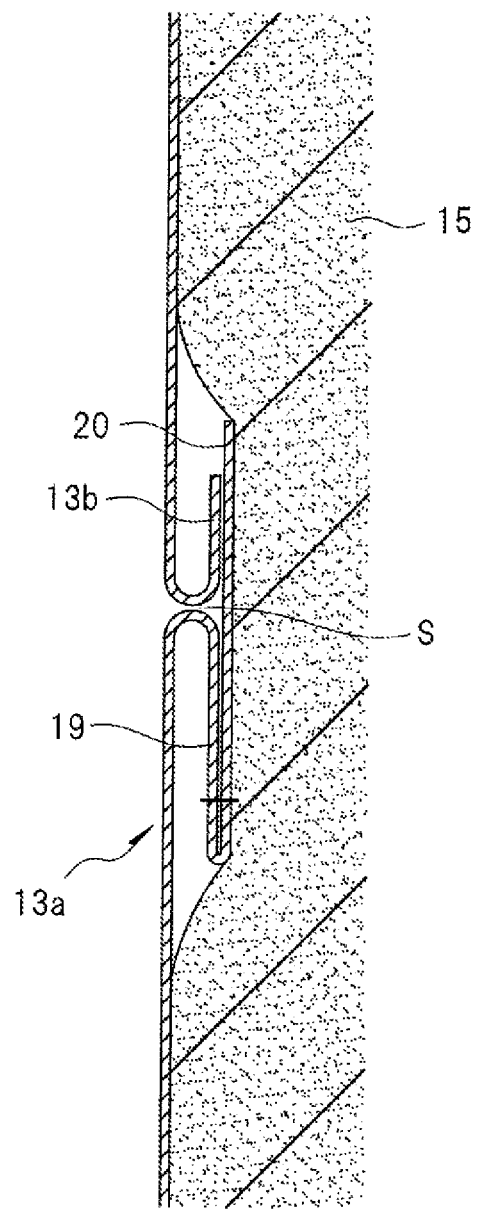
FIG. 7 is a cross-sectional view taken along line VII-VII in FIG. 2.

FIGS. 6 and 7 illustrate cross sections of the portion in which the first end portion 13a and the second end portion 13b of the peripheral surface skin piece 13 are joined.

As illustrated in FIG. 6, the second end portion 13b and the reinforcing plate 16 are inserted and locked into the lock portion 18 of the hook 12, and the first end portion 13a that is fixed to the base portion 17 of the hook 12 and the second end portion 13b that is inserted into the lock portion 18 are abutted against each other.

Even when a gap S is formed between the first end portion 13a and the second end portion 13b that are abutted against each other, in the center portions of the first end portion 13a and the second end portion 13b in the width direction, the hook 12 is arranged behind the gap S and the gap S is closed by the hook 12.

As illustrated in FIG. 7, in the both side portions of the first end portion 13a and the second end portion 13b in the width direction, the folded portion 20 protruding to the outside in the width direction from the hook 12 is arranged behind the gap S and the gap S is closed by the folded portion 20 instead of the hook 12.

Since only the second end portion 13b out of the first end portion 13a and the second end portion 13b that are joined through the hook 12 is inserted into the lock portion 18 of the hook 12, compared to a case in which both the first end portion 13a and the second end portion 13b are inserted into the lock portion 18, a joint operation of the first end portion 13a and the second end portion 13b is facilitated. Since the gap S formed between the first end portion 13a and the second end portion 13b is closed by the hook 12 and the folded portion 20, a problem that the pad 15 inside the cover is exposed through the gap S is solved.

Figure 8:
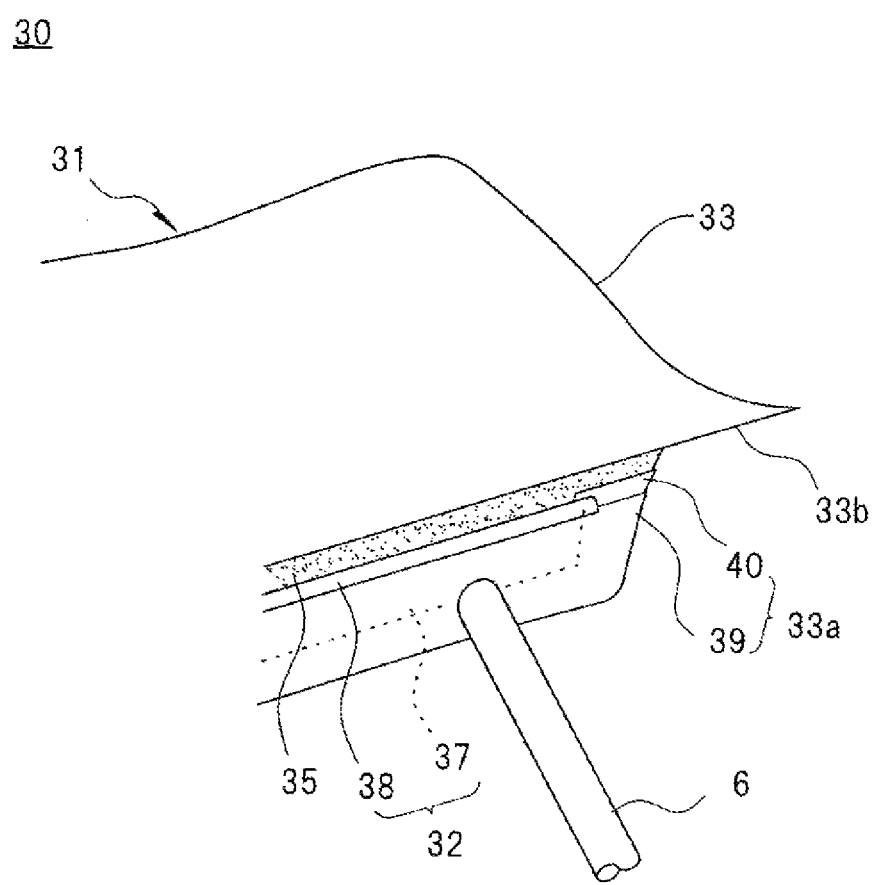
FIG. 8 is a perspective view of a part of a headrest of the vehicle seat in FIG. 1 surrounded by a broken line circle VIII for illustrating the embodiment of the present invention.

FIG. 8 illustrates a portion in which a first end portion and a second end portion of a skin constituting a trim cover of the headrest 4 are joined.

A trim cover 30 of the headrest 4 includes a skin 31 and a hook 32 that closes an opening provided in the skin 31.

The skin 31 includes a peripheral surface skin piece 33 that circumferentially covers a lower surface, a front surface, an upper surface, and a rear surface of the headrest 4 in which a pair of leg portions 6 of a frame of the headrest 4 are provided to protrude, and two side surface skin pieces (not illustrated) that cover both side surfaces of the headrest 4, and is formed by sewing these skin pieces together into a bag shape. The opening of the trim cover 30 into which a pad 35 is inserted is provided between a first end portion 33a and a second end portion 33b of the peripheral surface skin piece 33 on the lower surface of the headrest 4.

The hook 32 is fixed to the first end portion 33a of the peripheral surface skin piece 33. The second end portion 33b of the peripheral surface skin piece 33 is locked with the hook 32 fixed to the first end portion 33a so as to close the opening of the trim cover 30.

The hook 32 has a base portion 37 and a lock portion 38 similar to the hook 12 described above and is integrally formed to have a substantially J-shaped cross section as a whole. The first end portion 33a of the peripheral surface skin piece 33 is fixed to the base portion 37, and the second end portion 33b of the peripheral surface skin piece 33 is inserted and locked into the lock portion 38.

The first end portion 33a of the peripheral surface skin piece 33 has a fixed portion 39 that is fixed to the base portion 37 of the hook 32 and a folded portion 40 that is provided on the side closer to the terminal end than to the fixed portion 39.

The fixed portion 39 is overlapped with the front surface of the base portion 37 of the hook 32 in a state of being folded on the outer surface of the base portion 37 and is fixed to the base portion 37 by being sewn with the base portion 37. The folded portion 40 is folded toward the rear surface of the base portion 37 along an edge of the base portion 37 of the hook 32 on the side opposite to the lock portion 38 and is arranged to protrude toward the lock portion 38 of the hook 32 from the fixed portion 39.

The fixed portion 39 and the folded portion 40 are formed wider that the base portion 37 and the lock portion 38 of the hook 32, and both side portions of the folded portion 40 in the width direction are arranged to be overlapped with the base portion 37 and the lock portion 38 and protrude to the outside in the width direction from the base portion 37 and the lock portion 38.

Since only the second end portion 33b out of the first end portion 33a and the second end portion 33b that are joined through the hook 32 is inserted into the lock portion 38 of the hook 32, a joint operation of the first end portion 33a and the second end portion 33b is facilitated. Since a gap formed between the first end portion 33a and the second end portion 33b is closed by the hook 32 and the folded portion 40 of the first end portion 33a, a problem that the pad 35 inside the cover is exposed through the gap is solved.

Figure 9:
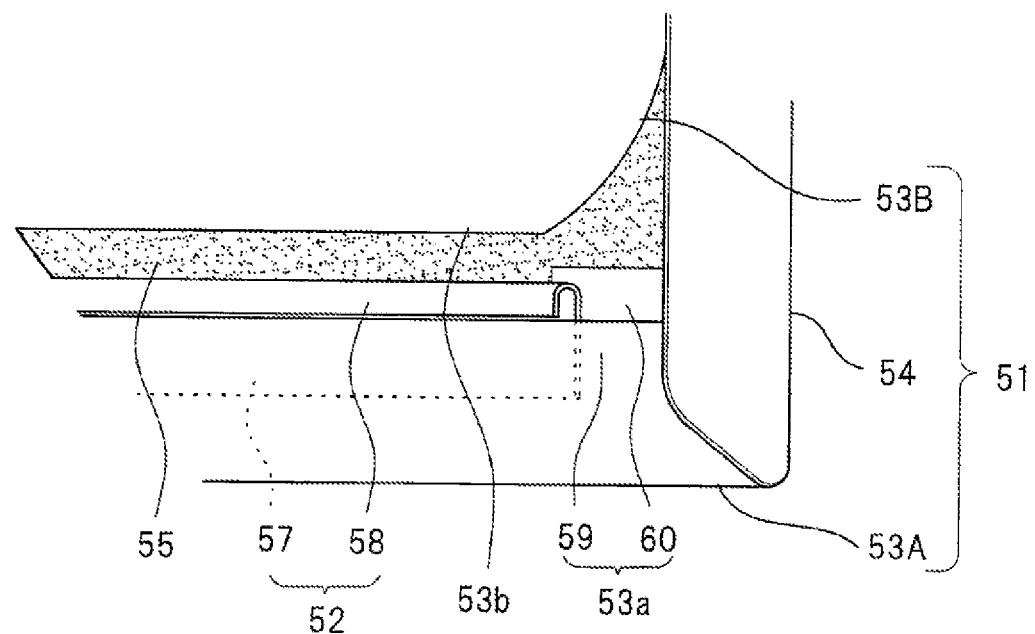
FIG. 9 is a perspective view of a part of a seat back of the vehicle seat in FIG. 1 surrounded by a broken line circle IX for illustrating the embodiment of the present invention.
Figure 10:
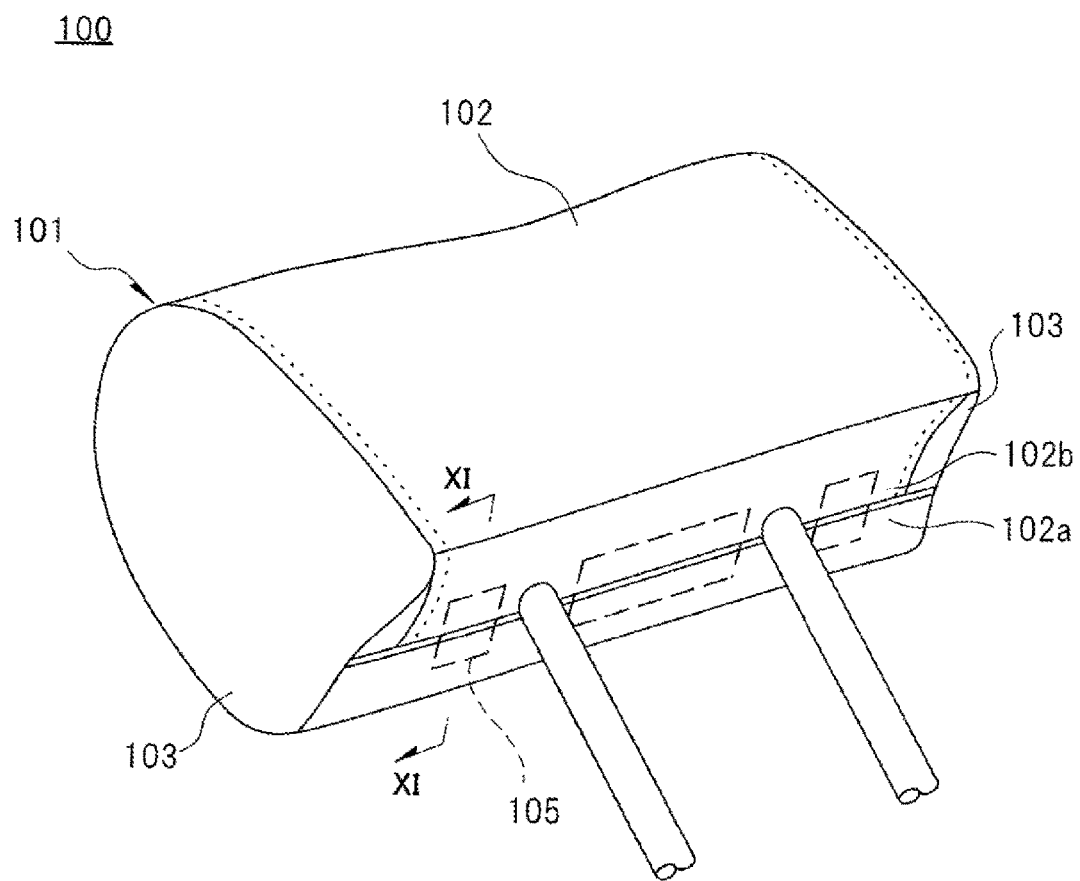
FIG. 10 is a perspective view of a headrest of the related art.
Figure 11:
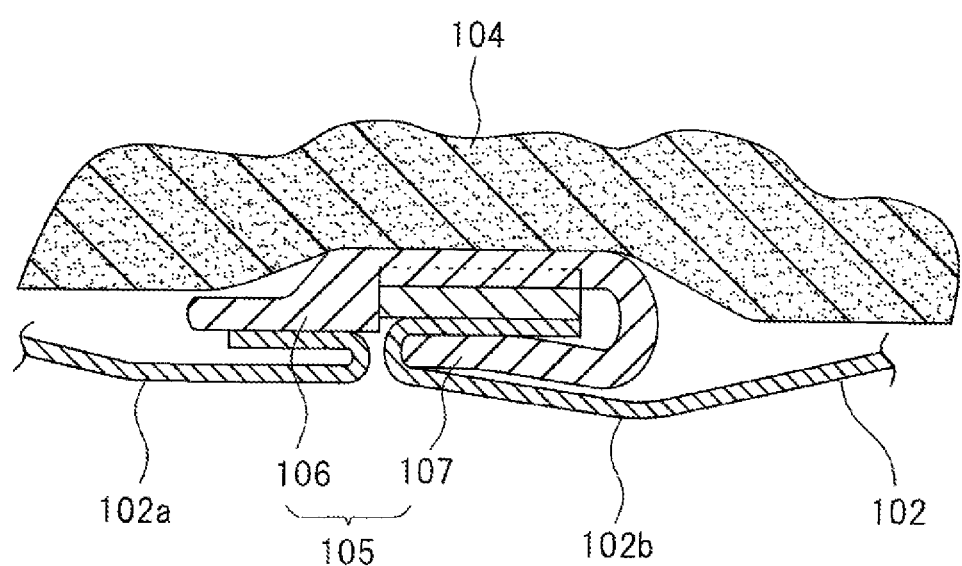
FIG. 11 is a cross-sectional view taken along line XI-XI in FIG. 10.
Figure 12:
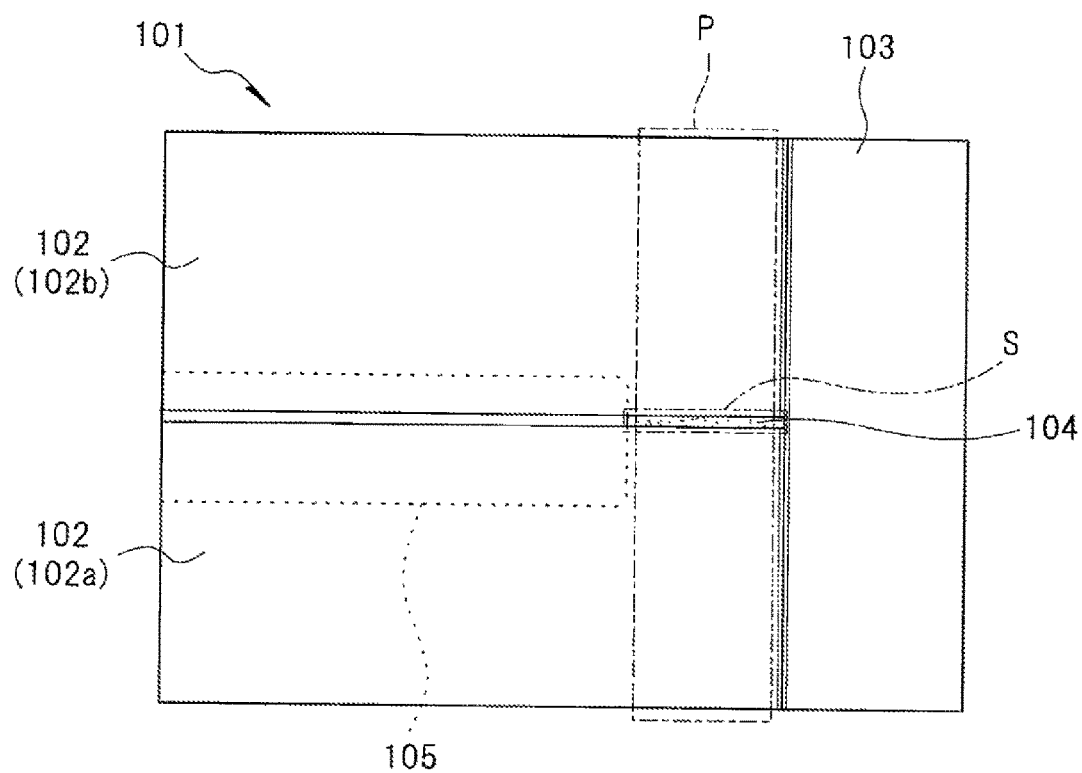
FIG. 12 is a schematic view of a portion in which a first end portion and a second end portion of a skin constituting a trim cover of the headrest in FIG. 10 are joined.
Figure 13:
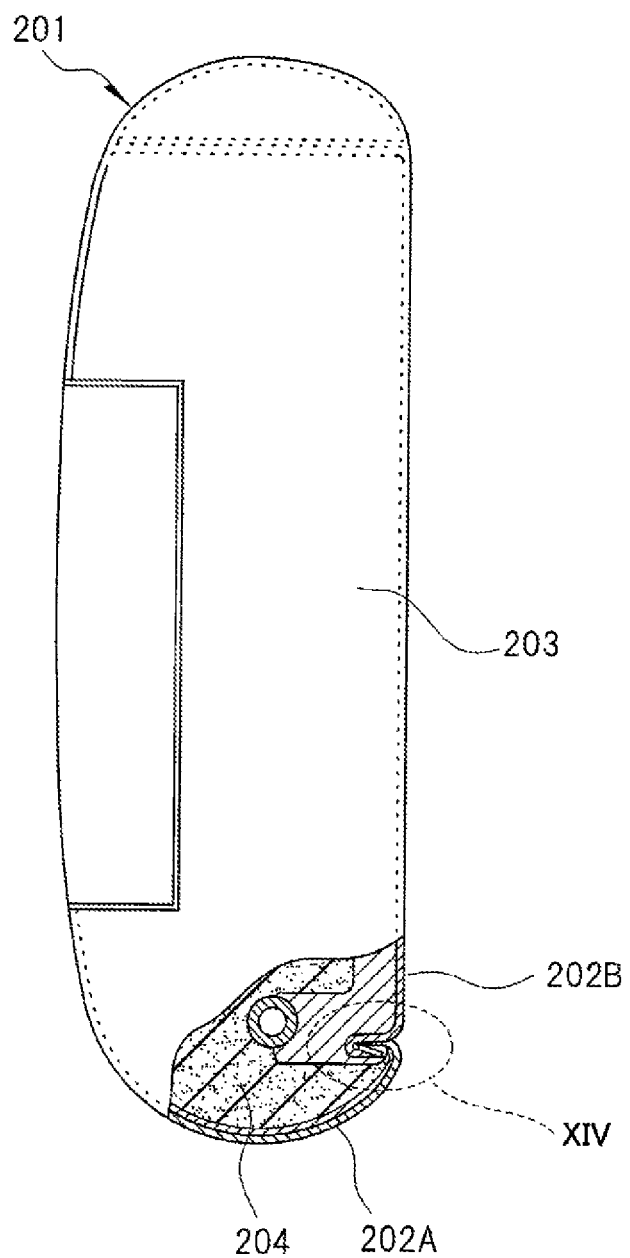
FIG. 13 is a side view illustrating a part of a seat back of the related art by cutting the seat back.
Figure 14:
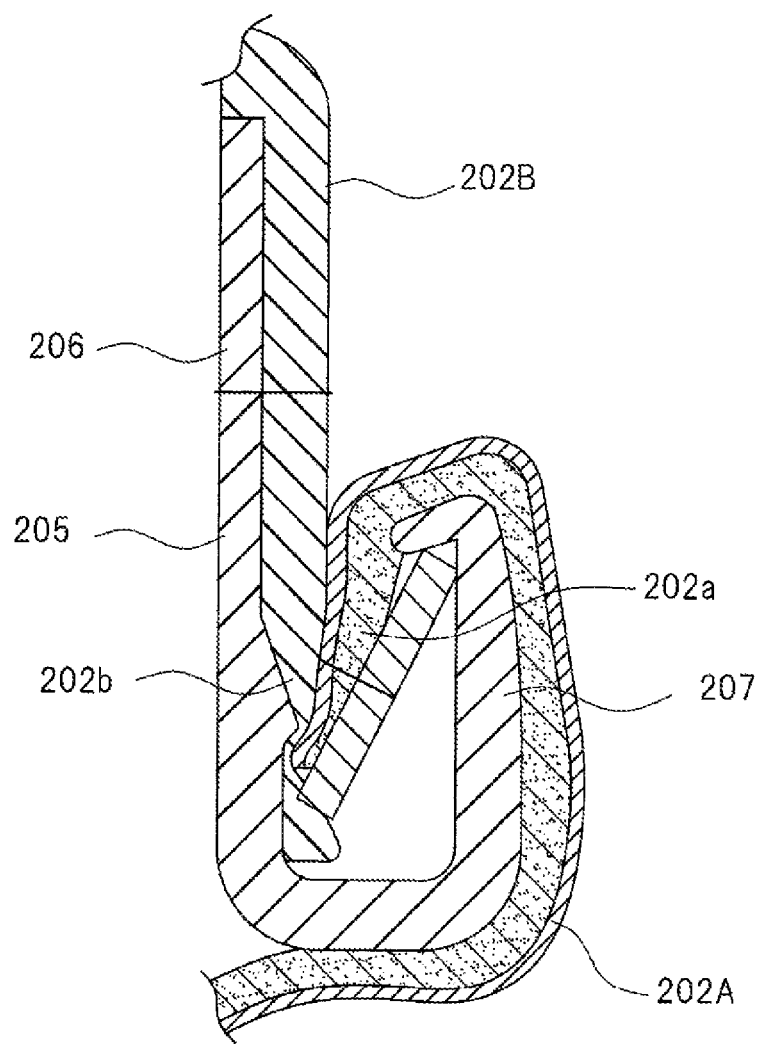
FIG. 14 is a cross-sectional view illustrating a part surrounded by a broken line circle XIV in FIG. 13 in an enlarged manner.

FIG. 9 illustrates a portion in which a first end portion and a second end portion of a skin constituting a trim cover of the seat back 3 are joined.

A trim cover 50 of the seat back 3 includes a skin 51 and a hook 52 that closes an opening provided in the skin 51.

The skin 51 includes a front surface skin piece 53A that covers an upper surface, a front surface and a lower surface of the seat back 3, a rear surface skin piece 53B that covers a rear surface of the seat back, and two side surface skin pieces 54 that cover both side surfaces of the seat back (only one side is illustrated in the drawing), and is formed by sewing these skin pieces together. The opening of the trim cover 50 into which a pad 55 is inserted is provided between a first end portion 53a of the front surface skin piece 53A and a second end portion 53b of the rear surface skin piece 53B in the lower part of the rear surface of the seat back 3.

The hook 52 is fixed to the first end portion 53a of the front surface skin piece 53A. The second end portion 53b of the rear surface skin piece 53B is locked with the hook 52 fixed to the first end portion 53a so as to close the opening of the trim cover 50.

The hook 52 has a base portion 57 and a lock portion 58 similar to the hook 12 described above, and is integrally formed to have a substantially J-shaped cross section as a whole. The first end portion 53a of the front surface skin piece 53A is fixed to the base portion 57, and the second end portion 53b of the rear surface skin piece 53B is inserted and locked into the lock portion 58.

The first end portion 53a of the front surface skin piece 53A has a fixed portion 59 that is fixed to the base portion 57 of the hook 52 and a folded portion 60 that is provided on the side closer to the terminal end than the fixed portion 59.

The fixed portion 59 is overlapped with the front surface of the base portion 57 of the hook 52 in a state of being folded on the outer surface of the base portion 57 and is fixed to the base portion 57 by being sewn with the base portion 57. The folded portion 60 is folded toward the rear surface of the base portion 57 along an edge of the base portion 57 of the hook 52 on the side opposite to the lock portion 58 and is arranged to protrude toward the lock portion 58 of the hook 52 from the fixed portion 59.

The fixed portion 59 and the folded portion 60 are formed wider than the base portion 57 and the lock portion 58 of the hook 52, and both side portions of the folded portion 60 in the width direction are arranged to be overlapped with the base portion 57 and the lock portion 58 and protrude to the outside in the width direction from the base portion 57 and the lock portion 58.

Since only the second end portion 53b out of the first end portion 53a and the second end portion 53b that are joined through the hook 52 is inserted into the lock portion 58 of the hook 52, a joint operation of the first end portion 53a and the second end portion 53b is facilitated. Since a gap formed between the first end portion 53a and the second end portion 53b is closed by the hook 52 and the folded portion 60 of the first end portion 53a, a problem that the pad 55 inside the cover is exposed through the gap is solved.

The present invention has been described above using the armrest 5, the headrest 4, and the seat back 3 as examples. However, the present invention can be applied to various seat parts in which both end portions of a skin of a trim cover for covering a pad are joined through a hook.

What is claimed is:

1. A trim cover for covering a pad comprising:
   a hook; and
   a skin having a first end portion and a second end portion that are joined with each other through the hook, wherein:
   the hook includes: a base portion to which the first end portion of the skin is fixed; and a lock portion that is connected to the base portion and into which the second end portion of the skin is inserted;
   the first end portion of the skin is formed wider than the base portion and the lock portion of the hook, and includes: a fixed portion that is fixed to the base portion to be overlapped with a front surface of the base portion of the hook in a state of being folded on an outer surface of the base portion; and a folded portion that is provided on a side closer to a terminal end than the fixed portion and is folded toward a rear surface of the base portion along an edge of the base portion of the hook on a side opposite to the lock portion; and both side portions of the folded portion in a width direction are arranged to protrude toward the lock portion of the hook from the fixed portion and further arranged to be overlapped with the lock portion and protrude to the outside in the width direction from the lock portion.

2. The trim cover according to claim 1, wherein a center portion between the both side portions of the folded portion in the width direction is cut out.

3. The trim cover according to claim 1, wherein slits extending along a boundary between the fixed portion and the folded portion from an edge of the corresponding side portion are respectively formed in both side portions of the first end portion in the width direction.

4. The trim cover according to claim 1, wherein the edge of each of the both side portions of the folded portion in the width direction is inclined to be broadened toward an end in a state in which the fixed portion and the folded portion are spread in a plane shape.

5. A seat part comprising:

a pad; and a trim cover including: a hook; and a skin having a first end portion and a second end portion that are joined with each other through the hook, wherein:

the hook includes: a base portion to which the first end portion of the skin is fixed; and a lock portion that is connected to the base portion and into which the second end portion of the skin is inserted;

the first end portion of the skin is formed wider than the base portion and the lock portion of the hook, and includes: a fixed portion that is fixed to the base portion to be overlapped with a front surface of the base portion of the hook in a state of being folded on an outer surface of the base portion; and a folded portion that is provided on a side closer to a terminal end than the fixed portion and is folded toward a rear surface of the base portion along an edge of the base portion of the hook on a side opposite to the lock portion;

both side portions of the folded portion in a width direction are arranged to protrude toward the lock portion of the hook from the fixed portion and further arranged to be overlapped with the lock portion and protrude to the outside in the width direction from the lock portion; and the trim cover covers the pad.

* * * * *